United States Patent [19]

Luecke et al.

[11] Patent Number: 4,804,510
[45] Date of Patent: Feb. 14, 1989

[54] FILTERING SYSTEM FOR USE IN COEXTRUSION APPARATUS AND METHOD OF USE

[75] Inventors: Robert A. Luecke; Gordon E. Gould, both of Newark; Paul M. Curtin, Columbus, all of Ohio

[73] Assignee: The Dow Chemical Company, Midland, Mich.

[21] Appl. No.: 67,848

[22] Filed: Jun. 30, 1987

[51] Int. Cl.$^4$ .............. B29C 47/04; B29C 47/56; B29C 47/68; D01D 1/10

[52] U.S. Cl. ............... 264/169; 210/314; 210/316; 210/446; 264/171; 425/133.1; 425/133.5; 425/197; 425/198; 425/199

[58] Field of Search .......... 264/169, 171, 173; 425/96, 107, 131.1, 133.1, 133.5, 185, 197, 198, 199; 210/314, 316, 446

[56] References Cited

U.S. PATENT DOCUMENTS

| | | | |
|---|---|---|---|
| 3,315,306 | 4/1967 | Ladner et al. | 425/133.5 |
| 3,511,903 | 5/1970 | Glass et al. | 264/171 |
| 3,528,130 | 9/1970 | Lefevre et al. | 425/131.1 |
| 3,641,232 | 2/1972 | Fontijen et al. | 264/171 |
| 3,743,459 | 7/1973 | Schrenk et al. | 425/133.5 |
| 3,950,476 | 4/1976 | Fontijn | 264/171 |
| 4,512,944 | 4/1985 | Astfalk et al. | 425/133.1 X |
| 4,611,987 | 9/1986 | Hahn et al. | 425/131.1 |
| 4,629,650 | 12/1986 | Kataoka | 264/171 X |

FOREIGN PATENT DOCUMENTS

| | | | |
|---|---|---|---|
| 51-10863 | 1/1976 | Japan | 425/133.5 |
| 55-27020 | 2/1980 | Japan | 210/446 |
| 56-49739 | 11/1981 | Japan | 425/133.1 |
| 58-5225 | 1/1983 | Japan | 264/169 |
| 60-101021 | 6/1985 | Japan | 264/169 |

Primary Examiner—Jeffery Thurlow
Assistant Examiner—Leo B. Tentoni

[57] ABSTRACT

A filtering system for use in coextrusion apparatus, and particularly for removing carbon particles from a core extrudate of thermally degradable barrier material which has been preencapsulated with a preencapsular material. The filter includes a casing and a frame mounted to the casing. A coarse filter screen through which the component streams can flow is also provided. The coarse filter screen is mounted to the frame and is composed of a web of woven strands having a sufficiently small diameter so as to permit the preencapsulated core extrudate to pass through and emerge from the coarse filter screen without substantial mixing of the barrier material and the preencapsular material. The fine filter screen is supported by the coarse filter screen upstream of the coarse filter screen.

15 Claims, 3 Drawing Sheets

FILTERING SYSTEM FOR USE IN COEXTRUSION APPARATUS AND METHOD OF USE

BACKGROUND OF THE INVENTION

The present invention relates to a method and apparatus for extruding a multilayer film, and more particularly to a filtering system for removing carbon particles from a preencapsulated extrudate of a thermally degradable barrier layer of the multilayer film.

In the manufacture of film materials, it is often desirable to utilize a multilayer film rather than a single layer one. By using a multilayer film, one can combine the properties of different types of materials to form a film having the qualities desired for the end use to which the film is placed.

For example, it is common practice to employ a barrier material, such as a Saran vinylidene chloride-vinyl chloride copolymer as an inner layer in a multilayer film in order to provide gas and moisture vapor barrier characteristics to the film. Such barrier layer containing multilayer films often have polyolefin outer layers. Arrangements of this type are illustrated by Lee et al U.S. Pat. No. 3,477,099, which is assigned to the same assignee as the instant invention, Komoda et al U.S. Pat. No. 4,410,602, and others.

As disclosed in Lee et al, a problem which exists in forming such multilayer films is that Saran barrier materials, which are halogenated resins, are difficult to extrude because of their corrosive nature. For that reason Lee et al discloses a system for encapsulating an extruded corrosive barrier material in a stream of non-corrosive material and subsequently shaping the stream into a film. A non-corrosive material may be a glue layer, such as an ethylene vinyl acetate, which not only serves to prevent the corrosive barrier material from contacting the surface of the extrusion die, but also helps bond the barrier layer to the outer layers in the resulting multilayer film.

While the system of Lee et al is a definite improvement in production of multilayer film containing a Saran barrier layer, problems still exist in that regard. Some of these problems result from the thermally degradable nature of Saran barrier materials. As a result of their thermal degradability, Sarans have a tendency to "carbonize" in the extrusion apparatus.

Carbonization results in the formation of small carbon particles in the molten extrudate. These carbon particles can result in a carbon build-up in the transfer tube leading from the barrier material extruder to the feed block where various components of the multilayer film are joined together. This carbon build-up in the transfer tube effectively reduces the inside diameter of the transfer tube, thereby creating an undesirable pressure drop and also serving as a source of contamination of the polymer.

Additionally, this carbonization can result in a carbon build-up in the adaptor portion of the feed block where the various polymer streams are joined together prior to extrusion by the coextrusion die. This carbon build-up in the feed block changes the shape of the multilayer film, which in turn creates variations in the thickness of the barrier layer. These variations in the thickness of the barrier layer are undesirable because of their deleterious impact on the physical properties of the film. Finally, this carbon build-up typically requires the manufacturer to shut down and clean the extrusion apparatus about every two weeks. This shut down and cleaning of the extrusion apparatus result in high maintenance costs and lost production time.

One method for reducing the amount of carbonization is to preencapsulate the themally degradable vinylidene chloride-vinyl chloride copolymer with a nonthermally degradable copolymer shortly after the barrier material from its extruder. A very effective preencapsulation process and apparatus is described below, and in more detail in a companion application Ser. No. 067,847 entitled "Coxtrusion Apparatus and Process for Production of Multilayer Film Containing A Barrier Layer", which is assigned to the same assignee as the present application, and was filed contemporaneously with the present application.

Although preencapsulation reduces the amount of carbon particles formed in the extrusion apparatus downstream from the point of preencapsulation, preencapsulation alone does not remove those carbon particles formed in the barrier material extruder. Such carbonization in the extruder occurs upstream of the preencapsulation means. The carbon particles formed in the barrier material extruder are typically carried by the barrier material extrudate downstream through the preencapsulation means, transfer tube, feed back coextrusion die and ultimately become part of the extruded multilayer film. As can be appreciated, the inclusion of these carbon particles in the multilayer film can adversely affect the quality of the multilayer film produced.

Therefore, it would be desirable to overcome the problems discussed above by providing a filtering system for removing the by-products of the carbonization of a thermally degradable barrier material.

SUMMARY OF THE INVENTION

In accordance with the present invention there is provided an extrusion apparatus which includes a filter for filtering a thermally degradable extrudate and a method of using such an apparatus. While the filtering system of the present invention is preferably used with a preencapsulated core extrudate of thermally degradable barrier material, it may also be used with other thermally degradable components of a coextruded multilayer film. The filter includes a casing, a frame mounted to the casing, and a coarse filter screen through which the preencapsulated core extrudate is passed. The coarse filter screen is mounted to the frame and is comprised of a web of woven strands having a sufficiently small diameter so as to permit the preencapsulated core extrude to pass through and emerge from the coarse filter screen without substantial mixing of the core material and the preencapsular material. A fine filter screen is also provided through which the extrudate streams can flow. The fine filter screen is supported by the coarse filter screen upstream of the coarse filter screen.

Preferably, the casing is disposed in an extrusion apparatus at the downstream end of the transfer tube for the preencapsulated core extrudate. Additionally, an intermediate filter screen can be interposed between the fine and coarse filter screens.

Also in accordance with the present invention, an extrusion apparatus is provided for coextruding a multilayer film from a plurality of feed stock materials. The extrusion apparatus includes a core extruder for extruding a core extrudate of barrier material. A preencapsulation means is provided adjacent the outlet of the core extruder. A transfer tube is used to transfer the preencapsulated core extrudate to a feed block and coextrusion die. A filter means is provided at the downstream end of the transfer tube for filtering impurities from the preencapsulated core extrudate.

One feature of the present invention is that the filter of the present invention permits a pair of substantially unmixed component streams to flow through and emerge from the filter without a substantial mixing of the component streams, and without the relative positioning of the streams being altered substantially. This feature has the advantage of providing a filter which removes impurities in the extrudate, while still perserving the benefits achieved by preencapsulation.

It also a feature of the present invention that the filter of the present invention is used in conjunction with the preencapsulation of a thermally degradable extrudate. The filtration and preencapsulation processes are complimentary. The filtration helps to remove impurities from the extrudate, and the preencapsulation helps to reduce the amount of impurities formed in the extrusion apparatus, especially in those components of the extrusion apparatus downstream from the filter.

Additional features and advantages of the present invention will become apparent to those skilled in the art upon consideration of the following detailed description of a preferred embodiment exemplifying the best mode of carrying out the invention as preceived presently.

DETAILED DESCRIPTION OF THE PREFERRED EMBODIMENT

Figure 1:
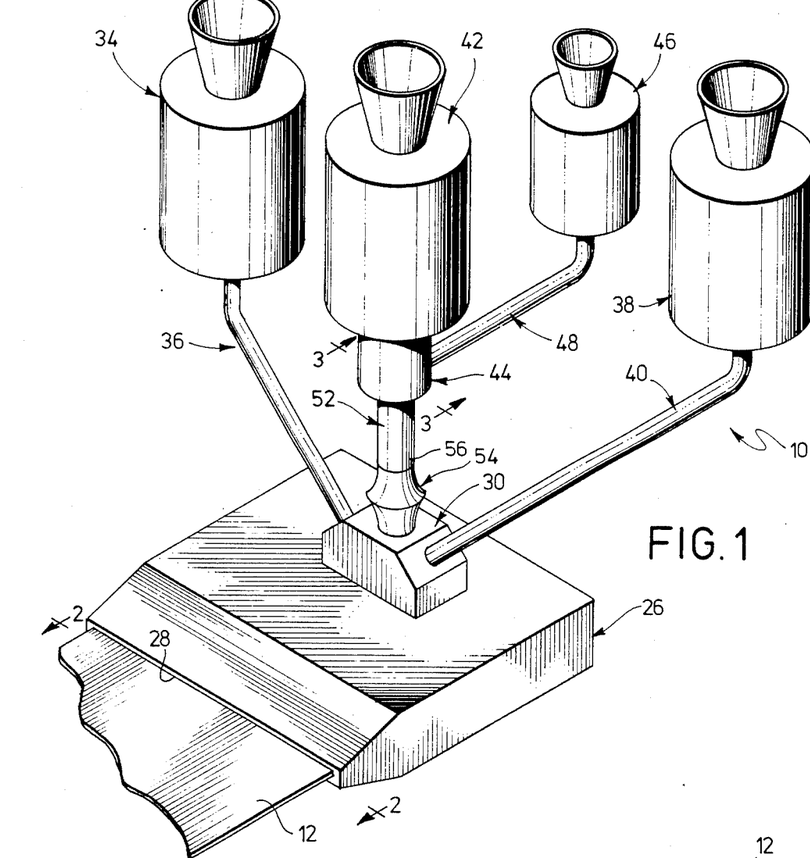
FIG. 1 is a perspective view of the extrusion apparatus of the present invention.

An extrusion apparatus 10 is shown in FIG. 1 for extruding a multilayer film 12 which includes a plurality of component layers, and is formed from a plurality of feed stock materials. The multilayer film 12 (FIG. 2) includes an outer layer 14, which forms the top surface 14', bottom surface 14" and side surfaces 14''' of the multilayer film 12. Preferably, the outer layer 14 is composed of a polyolefin material such as polyethylene. A glue layer 16, having surface 16' adjacent to the interiorly of top surface 14' of the outer layer and surface 16" adjacent to and interiorly of the bottom surface 14" of the outer layer is preferably comprised of an ethylene vinyl acetate copolymer. A preencapsulation layer 18 is disposed interiorly of glue layer 16, and completely encapsulates the core layer 20. Preencapsulation layer 18 is also preferably composed of an ethylene vinyl acetate copolymer.

Figure 2:
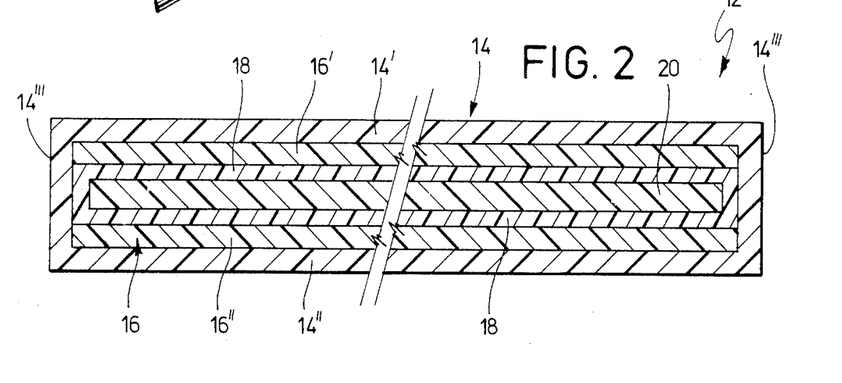
FIG. 2 is an enlarged, sectional view taken along lines 2—2 of FIG. 1.

Glue layer 16, and preencapsulation layer 18 may be composed of the same material, different materials, or different blends of the same material, such as different blends of an ethylene vinyl acetate copolymer. For example, the applicants have found that a savings in material cost can be achieved by using an ethylene vinyl acetate copolymer blend for the preencapsulation layer which is different than the ethylene vinyl acetate copolymer blend used for the glue layer. These cost savings are achieved in the following manner. The cost of an ethylene vinyl acetate copolymer is generally proportional to the percentage of vinyl acetate in the copolymer. Thus, a copolymer having a high percentage of vinyl acetate is generally more expensive than a copolymer having a low percentage of vinyl acetate. However, in order to form a good bond with the Saran barrier material which preferably comprises core layer 20, an ethylene vinyl acetate copolymer having a relatively high percentage of vinyl acetate is required. Conversely, an ethylene vinyl acetate copolymer having a relatively low percentage of vinyl acetate can be utilized to create a secure bond to the polyolefin outer layer 14. Thus, by using an ethylene vinyl acetate copolymer having a relatively high percentage of vinyl acetate (typically greater than 14 percent vinyl acetate) for the preencapsulation layer 18, a secure bond can be formed with the Saran core layer 20. By using an ethylene vinyl acetate copolymer having a relatively lower vinyl acetate percentage (such as between about 8 and 14 percent vinyl acetate) for glue layer 16, a good bond can be formed with the polyolefin outer layer 14, while achieving a substantial cost savings through the use of a relatively lower cost ethylene vinyl acetate for glue layer 16.

As mentioned, the core layer 20 is preferably composed of Saran, vinylidene chloride-vinyl chloride copolymer. As discussed above, a Saran material is useful in the construction of a multilayer film because of the relatively gas impermeable and moisture impermeable nature of the Saran. However, as also mentioned Sarans and other halogenated resins are thermally degradable. The present process offers advantages anytime the multilayer film is to include a thermally unstable core material, such as Saran resin, or other halogenated resin barrier material, other polyminylidene chloride polymers or copolymers, polyvinyl chloride polymers or copolymers, polyacrylonitrile, etc. For a more complete discussion of the materials which can be used for outer layer 14, intermediate glue layer 16, and core layer 20, see Lee, Jr., et al U.S. Pat. No. 3,477,099.

As will be appreciated, the relative thicknesses of the outer layer 14, glue layer 16, preencapsulation layer 18 and core layer 20 can be varied depending upon the particular application to which the multilayer film 12 is placed. In one film made by the applicants, each of top surface 14' and bottom surface 14" of outer layer 14 were approximately 0.000625 inches thick; each of the top and bottom surfaces 16', 16" of glue layer 16 were 0.000214 inches thick; each of the top, bottom and side surfaces preencapsulation layer 18 was 0.000036 inches thick; and the core layer 20 was approximately 0.00025 inches thick. As polyethylene is the least expensive component of the film, thicker films are generally made by increasing the thickness of outer layer 14.

Referring back for FIG. 1, the extrusion apparatus 10 includes a coextrusion die 26 having a die slot 28 through which the multilayer film 12 is extruded. A feed block 30 is disposed upstream and adjacent to the coextrusion die 26. The feed block 30 feeds the various extrudates to the coextrusion die 26, and joins the various extrudates from which the multilayer film 12 is made in a proper relation so that the components will be placed in their proper relative position for extrusion through coextrusion die 26.

An outer layer extruder 34 is provided for extruding an outer layer extrudate which will ultimately become outer layer 14 in the multilayer film 12. A transfer means 36 extends between the outer layer extruder 34 and the feed block 30.

A glue extruder 38 is provided for extruding a glue extrudate which will ultimately become glue layer 16, in the finished multilayer film 12. A transfer tube 40 extends between the glue extruder 38 and the feed block 30.

A core extruder 42 is provided for extruding a core extrudate which will ultimately become core layer 20 of the multilayer film 12. A preencapsulation means 44 is provided adjacent the outlet of the core extruder 42, and receives the core extrudate extruded by the core extruder 42 immediately after its extrusion. A preencapsulatar extruder 46 is provided for extruding an preencapsulatar extrudate which will ultimately become preencapsulation layer 18 of the finished multilayer film 12. A transfer means 48 is provided for transferring the freshly extruded preencapsular extrudate to the preencapsulation means 44. In the preencapsulation means 44, the preencapsular extrudate is joined to the core extrudate in a nonmixing, encapsulating relation, so that when the preencapsulated core extrudate delivered to, and flows in, transfer tube 52, the preencapsular material and core material will be disposed in a coaxial relation with the preencapsular material disposed radially outwardly of the core material.

Transfer tube 52 is disposed downstream of the preencapsulation means 44, and is provided for transferring the preencapsulated core extrudate to feed block 30. A filter 54 is interposed between the downstream end 56 of transfer tube 52, and feed block 30 for filtering out any particulate matter flowing in transfer tube 52 before the preencapsulated core extrudate reaches the feed block 30. The structure and functions of filter 54 are described in more detail below.

Figure 3:
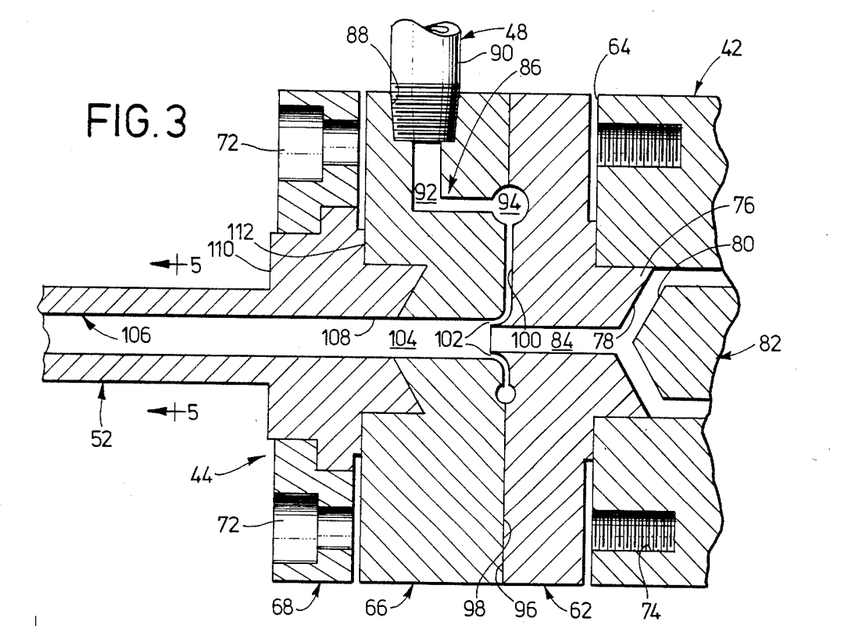
FIG. 3 is an enlarged, sectional view taken along lines 3—3 of FIG. 1 of the pre-encapsulation means of the present invention.

The preencapsulation means 44 is shown in more detail in FIG. 3 as including an axially arrayed series of members which define a series of pathways in the preencapsulation means 44 for directing the flow of core extrudate and preencapsular extrudate therein. The preencapsulation means 44 includes an inner member 62 disposed adjacent to the downstream end 64 of core extruder 42, a middle member 66 disposed axially outwardly from the inner member 62, and an outer member 68 disposed axially outwardly from the middle member 66. The inner middle and outer members 62, 66, 68 are placed in an end to end, colinear relation, and are disposed between the downstream end of 64 of the core extruder 42 and the upstream end of transfer tube 52. The inner, middle and outer members 62, 66, 68 are mounted to the core extruder by bolts 72 which pass through aligned openings in the inner, middle and outer members 62, 66, 68. The bolts 72 are threadedly engaged in axially outwardly opening apertures 74 in the core extruder 42.

Inner member 62 is generally disk shaped, and includes an axially extending leg 76 having a conically shaped axially inner end 78. The conically shaped axially inner end 78 is disposed in a spaced, parallel relation to the downstream end 80 of the extrusion advancing screw 82 of the core extruder 42. Inner member 62 also includes an axially extending central pathway 84. The downstream end 80 of the extrusion advancing screw 82, and the conical axial end 78, and central pathway 84 of the inner member 62 so as to define a core extrudate pathway through which the core extrudate flows immediately after its extrusion by the core extruder 42.

Likewise inner member 62 and middle member 66 cooperate to define a preencapsular extrudate pathway 86 in the preencapsulation means 44 for directing preencapsular extrudate to the stream of core extrudate flowing through the central pathway 84. The preencapsular extrudate pathway 86 includes an inlet portion 88 for receiving the downstream end 90 of the preencapsular extrudate transfer means 48, and thus for receiving the preencapsular extrudate flowing therein. The preencapsular extrudate pathway 86 also includes an L-shaped (in cross section) portion 92 (in cross-section) having a radially inwardly extending leg and an axially inwardly extending leg. The L-shaped portion 92 is disposed downstream from the inlet portion 88 for receiving preencapsular extrudate from the inlet portion 88 and for directing the preencapsular extrudate to a spiralling raceway 94 formed between the axially outer surface 96 of inner member 62, and the axially inner surface 98 of middle member 66. The preencapsular extrudate pathway 86 also includes a radially inwardly extending portion 100 which extends between the raceway 94 and the outlet portion 102 of the preencapsular extrudate pathway 86. The outlet portion 102 circumferentially surrounds the downstream end of the central pathway 84, and extends generally axially to direct the flow of the preencapsular extrudate in an axial direction, so that the preencapsular extrudate flowing out of the outlet portion 102 joins the core extrudate flowing out of the central pathway 84 in a coaxial, surrounding relation in the preencapsulated core extrudate pathway 104.

The preencapsulated core extrudate pathway 104 is disposed colinearly with the central pathway 84 and has a cross-sectional area generally equal to the combined cross-sectional areas of the outlet portion 102 of the preencapsular extrudate pathway 86, and the central pathway 84, so that the flows of core and preencapsular material are not substantially restricted in preencapsulated core extrudate pathway 104. For example, in one embodiment of the instant invention, the cross-sectional area of the central pathway 84 is approximately 0.077 square inches, the cross-sectional area of the outlet 102 of the preencapsular extrudate pathway 86 is approximately 0.034 square inches, and the cross-sectional area of the preencapsulated core extrudate pathway 104 is approximately 0.11 square inches.

Transfer tube 52 includes an interior passageway 106 having an upstream end 108. The upstream end 108 of the interior passageway 106 of transfer tube 52 is disposed colinearly with, and has generally the same cross-sectional area as the preencapsulated core extrudate pathway 104 so as not to induce perturbations in the flow of the preencapsulated core extrudate as it moves from pathway 104 into the interior passageway 106. A collar 110 is formed at, or fixed to the upstream end of transfer tube 52. The collar 110 is mateable with the axially outwardly facing surface 112 of middle member 66, for properly positioning transfer tube 52 on the preencapsulation means 44. The ring-shaped outer member 68 of the preencapsulation means 44 serves as a yoke for maintaining the collar 110 on the preencapsulation means.

Figures 4, 5:
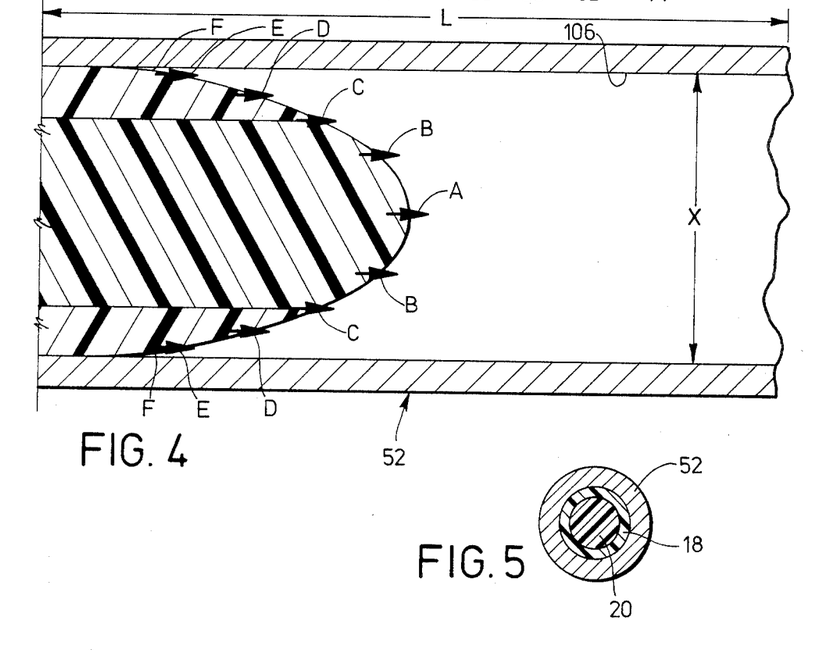
FIG. 4 is an enlarged, schematic view of the combined extrudate transfer tube of the present invention.
FIG. 5 is a sectional view taken along lines 5—5 of FIG. 3.

The flow of core material and preencapsular material through the interior passageway 106 of the transfer tube 52 is shown in FIG. 5. The flow of core and preencapsular material is generally coaxial with the preencapsular material being disposed radially outwardly of the core material. The stream of preencapsular material surrounds the stream of core material to prevent substantion contact between the core material and the wall of the interior passageway 106, and to maintain the flow of core material 114 in the central portion of the interior passageway 106.

The manner in which the instant invention helps to prevent carbonization of the core material is best explained with reference to FIG. 4. As discussed above, the core extrudate is preferably made from a vinylidene chloride-vinyl chloride copolymer. Although Saran is favored because of its excellent barrier properties, they are difficult to extrude due to the fact that it is thermally degradable. The amount of thermal degradation of these vinylidene chloride-vinyl chloride copolymers increases at increasing temperatures. Further, the amount of thermal degradation at any one particular temperature will increase as the residence time of the Saran in the extrusion apparatus increases. For example, at normal extrusion temperatures (approximately 185° C.), vinylidene chloride-vinyl chloride copolymers tend to evolve gas in approximately ten minutes. The evolution of gas is generally indicative of the thermal degradation, carbonization, of the Saran. It is desirable to avoid this carbonization.

Merely increasing the velocity of the flow of the core extrudate through the transfer tube 52, feed block 30 and coextrusion die 26 to decrease the average residence time of the core extrudate will not completely eliminate the carbonization of the core extrudate. If the residence time of the slowest moving fraction of the stream of core material is more than the time required to cause thermal degradation, carbonization still takes place. The present invention utilizes a preencapsular material to provide flow characteristics for the core material in transfer tube 52, feed block 30 and coextrusion die 26, which help to ensure that even the slowest moving fraction of the core, material moves through the extrusion apparatus 10 sufficiently quickly so that its residence time in transfer tube 52, feed block 30 and coextrusion die 26 is generally less than the residence time necessary to cause thermal degradation.

FIG. 4 illustrates the hypothesized flow characteristics of the preencapsulated core extrudate through transfer tube 52.

A preencapsulated core extrudate can be assumed to be a hypothetical perfectly newtonian core material surrounded by a hypothetical perfectly newtonian preencapsular material. With such a hypothetical preencapsulated core extrudate flowing through a circular cross-section transfer tube 52 having, as an example, a diameter of 0.89 cm, (a radius of 0.445 cm), a length of 28 cm, at a combined average velocity of 128.85 cm/min, one can calculate the velocity of a fraction and residence time of each fraction of the core material and each fraction of the preencapsular material. Presented below in table 1.1 are calculations for the average velocity and residence time of these hypothetical materials. As will be seen in FIG. 4, fractions A and B are fractions of the hypothetical core material, fractions D, E and F are fractions of the hypothetical preencapsular material, and fraction C represents the fraction traveling at the interface between the core material and preencapsular material. Thus, fraction C represents both the radially outwardmost fraction of the core material, and the radially inwardmost fraction of preencapsular material.

TABLE 1.1

| FRACTION | RADIUS OF FRACTION | VELOCITY OF FRACTION | RESIDENCE TIME |
|---|---|---|---|
| A | 0 | 257.70 | 0.11 |
| B | 0.149 cm | 228.81 | 0.12 |
| C | 0.297 cm | 142.89 | 0.20 |
| D | 0.371 cm | 78.58 | 0.36 |
| E | 0.440 cm | 5.76 | 4.86 |
| F | 0.444 cm | 1.14 | 24.50 |

It should be noted that the above calculations are accurate for only a perfectly laminar flow of a perfect newtonia fluid through a pipe having a perfectly circular cross-section, and therefore do not represent the flow of the preencapsulated core extrudate through transfer tube 52 with complete accuracy. Notwithstanding these deficiencies, the above table is useful in describing the general behavior of the preencapsulated core extrudate as it flows through transfer tube 52.

From the above table, one can make several generalizations regarding the flow of the hypothetical preencapsulated core extrudate which should be applicable to the actual extrudate. For example, the flow of a material, such as core material, through the center of the transfer tube 52 is quicker than the flow of a material, such as preencapsular material, adjacent the walls of the tube. Thus, if one can restrict the flow of a time critical thermally degradable material, such as a Saran barrier material, to the interior portion of transfer tube 52, one can decrease not only the residence time of the thermally degradable core material through transfer tube 52, but can also reduce the residence time of the slowest moving fraction C of the thermally degradable core material in transfer tube 52 to a time less than the time required to thermally degrade the core material. It can also be generalized that by adjusting the relative quantities of the materials flowing through transfer tube 52, one can decrease or increase the radius of the slowest moving fraction C of the thermally degradable core material and thereby increase or decrease, respectively, the residence time of the slowest moving fraction C of thermally degradable core material in transfer tube 52. It will also be appreciated that if one knows or can approximate the longest amount of time that a particular material can withstand the temperatures within the extrusion apparatus 10, one can adjust the relative quantities of preencapsular material and thermally degradable core material to ensure that the slowest moving fraction C of the thermally degradable core material has a residence time less than the time required to cause this thermal degradation.

However, it should be noted that there is a practical limit to the amount one can increase the volume of preencapsular material relative to the amount of the thermally degradable core material. It has been found by the applicants that if the ratio of preencapsular material to thermally degradable core material is too great, the useable width of the multilayer film 12 extruded through die slot 28 will decrease. The useable width decreases because the relatively small amount of core material is insufficient to be extruded properly from edge to edge in the multilayer film 12.

The above principles also permit one to make certain generalizations regarding the effect of changing other parameters. For example, as the length of transfer tube 52 increases, the relative ratio of preencapsular material to thermally degradable core material must increase to maintain the same residence time of the slowest moving fraction C. Conversely, as the length of the transfer tube 52 decreases, the ratio of preencapsular material to thermally degradable core material can be decreased. As the permissible residence time of the material increases (such as by using a core material which can withstand a longer residence time without thermally degrading), the ratio of preencapsular material to thermally degradable core material can be decreased. Likewise, as the permissible residence time decreases, the ratio of preencapsular material to thermally degradable core material can be increased. Further, as the average velocity of the materials through transfer tube 52 increases, the ratio of preencapsular material to thermally degradable core material can be decreased, and as the average velocity decreases, the ratio of preencapsular material to thermally degradable core material can be increased. Also, as the acceptable residence time of most suitable thermally degradable core materials is inversely proportional to their temperature, an increase in the temperature of the thermally degradable core material requires that a greater ratio of preencapsular material to thermally degradable core material be used.

Through experimentation, the applicants have found that, for an extrusion apparatus having a transfer tube 52, feed block 30 and coextrusion die 26 having a combined length of about 30 inches, and having a temperature of approximately 185° C., the preencapsular extrudate should weigh between approximately 7 and 25% of the weight of the core extrudate and preferably between approximately 10 and 15%.

Figure 6:
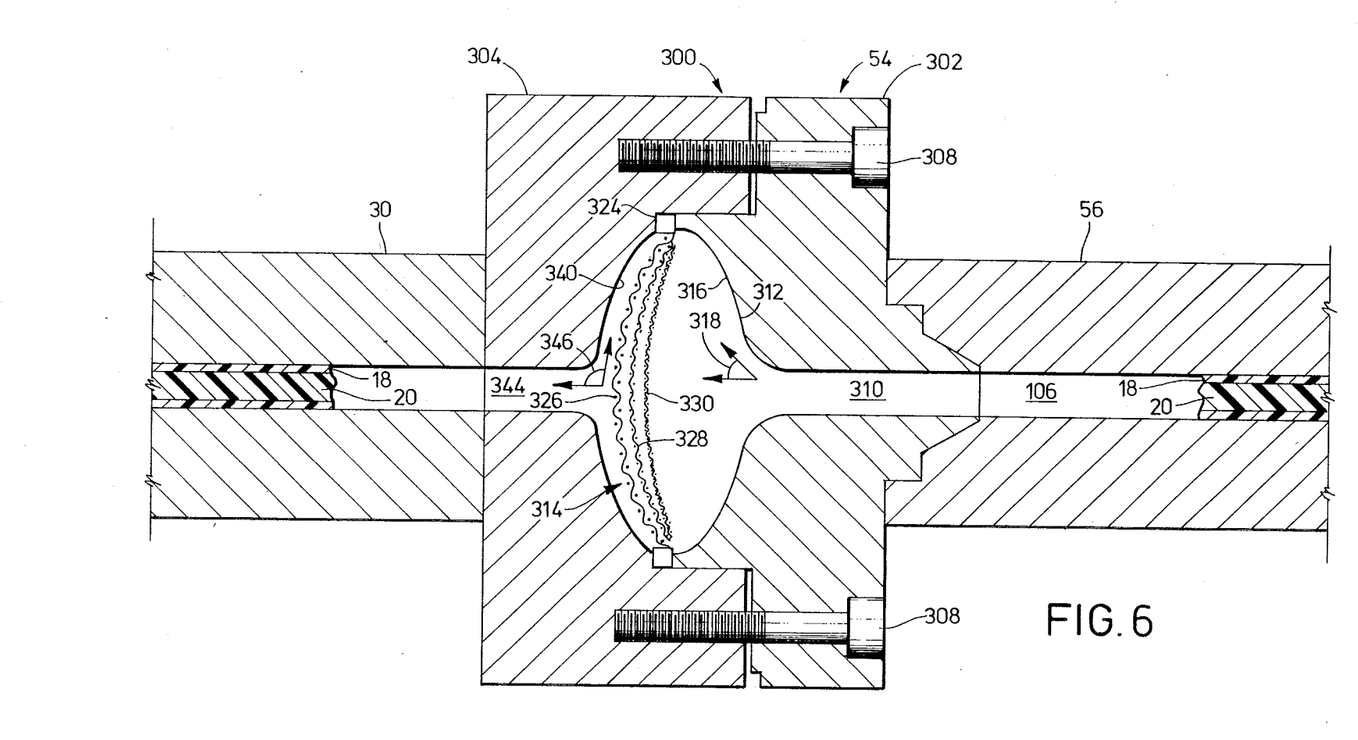
FIG. 6 is an enlarged sectional view of the filter for use with the extrusion apparatus of the present invention.

The filter 54 for filtering impurities from the preencapsulated core extrudate is best shown in FIG. 6. The filter 54 is disposed at the downstream end of the transfer tube 52, and upstream from the feed block 30. The filter 54 includes a casing 300 which comprises the first casing member 302, a second casing member 304, and one or more bolts 308, which are provided for anchoring together the first and second casing members 302, 304.

The first casing member 302 defines a central passageway 310 which is colinear with, and downstream of the interior passageway 106 of transfer tube 52. The central passageway 310 receives the preencapsulated core extrudate from the interior passageway 106, and delivers it to the filter chamber 312 which houses filter element 314. The downstream end of the central passageway 310 is flared radially outwardly, and defines an inlet portion 316 of the filter chamber 312. The walls of the inlet portion 316 are flared outwardly at an angle 318 of between 60° and 100° to the direction of travel 320 of the preencapsulated core extrudate. In one embodiment, the inlet portion is flared at about a 75 degree angle 318.

The inlet portion 316 is flared outwardly to accomodate a filter element 314 having a larger diameter than the diameter of the central passageway 310. A larger diameter filter element 314 is used to provide a greater surface area for the trapping of impurities, such as the carbon particle by-products of the thermal degradation of the thermally degradable core material. The greater surface area extends the time between replacements of the filter element 314. In one embodiment of the instant invention, the filter element has a diameter of about 1.9 inches.

The filter element 314 includes a ring like frame 324 which is mounted to the casing 300 in a space defined between the first and second casing members 302, 304. Although the frame 324 is shown as being circular and fixed in place, the frame 324 can comprise a generally rectangular, slideable type frame cartridge which can be moved into and out of its position in the filter chamber 312 by an operator to change the filter. The filter element 314 also includes three filter screens through which the preencapsulated core extrudate flows for filtering out impurities in the core extrudate. These three filter screens include a coarse filter screen 326, an intermediate filter screen 328, and a fine filter screen 330. The three filter screens 326, 328, 330 each comprise a web of woven fiber strands which define a plurality of interstices between adjacent strands.

The coarse filter screen 326 is fixed to the frame 324 to be held in place by the frame 324. Although the coarse filter screen 326 does provide some filtering of the preencapsulated core extrudate, its primary function is to serve as a support for the fine and intermediate filters 330, 328. As the preencapsulated core extrudate does flow through the coarse screen 326, the type and size of strands used in the coarse filter screen 326, and the spacing between adjacent strands (and hence the size of the interstices beteen the strands), does impact the flow characteristics of the preencapsulated core extrudate as it passes through the coarse filter screen 326. One desired characteristic of all three screens 326, 328, 330, is that the radially outer/radially inner positioning of the preencapsular material and core material not be upset during the passage of the preencapsulated core extrudate through the screens 326, 328, 330. The core material and preencapsular material, should emerge from filter element 314 in a substantially unmixed relation wherein the preencapsular material remains disposed coaxially with, and radially outwardly of the core material. To this end, a web of woven fibers is chosen for the coarse, intermediate and fine filter screens 326, 328, 330, which allows the preencapsulated core extrudate to flow smoothly through the filter screens 326, 328, 330, and which will not induce an undesirable amount of eddies and perturbations in the flow of the preencapsulated core extrudate. As can be appreciated, an undesirable amount of eddies and perturbations could contribute to the mixing of the core material and preencapsular material. Preferably, the coarse filter screw 326 is comprised of a web of woven strands, with each strand having a diameter of between about 0.025 and 0.063 inches, and preferably about 0.032 inches. The spacing between adjacent strands should be between about 0.1 and 0.2 inches, and preferably about 0.125 inches.

The intermediate filter screen 328 is disposed upstream of and adjacent to the coarse filter screen 326. The intermediate filter screen in not mounted directly to the frame 324. Rather, the intermediate filter screen 328 is supported by the coarse filter screen 326. The intermediate filter screen 328 is intermediate both in its position relative to the coarse and fine filter screens 326, 330, and also in the size of the particles it will filter. The intermediate filter screen 328 is preferably comprised of a web of woven strands having an average diameter of between about 0.012 and 0.02 inches, and preferably about 0.015 inches. The average spacing between strands should be between about 0.03 and 0.05 inches, and preferably about 0.04 inches. The primary function of the intermediate screen 328 is to serve as a support for the fine filter screen 330. The relatively small interstices of the intermediate screen 328 prevent the fine screen 330 from bulging through the relatively larger interstices of the coarse screen 326.

The fine screen 330 is disposed upstream of the intermediate screen 328, and provides the primary filtering for the preencapsulated core extrudate. The fine filter screen 330 is comprised of a web of woven fiber strands having an average diameter of between about 0.002 and 0.006 inches, and preferably about 0.0045 inches. The spacing between adjacent strands is between about 0.006 and 0.015 inches, and preferably about 0.01 inches, to capture particles of impurities having a size greater than about 0.01 inches.

The primary impurities caught by the filter 314 are the by-products of the thermal degradation of the thermally degradable core material. Most of these impurities have their origin in the core extruder 42, which is disposed upstream of preencapsulation means 44.

The filtration and the preencapsulation cooperate to reduce the amount of impurities (i.e. any particulate contaminates and any by-products of any thermal degradation of the core extrudate) in the multilayer film 12. The preencapsulation means 44 helps to prevent the formation of carbon particles in the extrusion apparatus 10 downstream from the preencapsulation means 44. Filter element 314 does not significantly disrupt the relative positioning of the core material and preencapsular material and therefore formation of particles downstream from the filter element 314 is minimized. Likewise filter element 314 captures the carbon particles formed upstream from the filter element 314 as well as any other particulate contaminates.

The second casing member 304 defines a radially inwardly flared outlet portion 340. The radially inner portion of the outlet 340 opens into a central passageway 344. The radially inwardly flared outward portion 340 is flared radially inwardly at between about a 100° and 135° angle 346 to the direction of flow of the preencapsulated core extrudate, and preferably at about a 110° angle 346. The central passageway 344 is colinear with the central passageway 310 of the first casing member 302, and delivers the preencapsulated core extrudate flowing therein to the feed block 30.

The inlet and outlet portions 316, 340 are flared at their respective angles in order to provide a smooth transition in the flow of the preencapsulated core extrudate from the relatively small diameter central passageway 310 to the relatively larger diameter filter chamber 312, and from the relatively larger diameter filter chamber 312 to the relatively smaller diameter central passageway 344 of the second casing member 304. The applicants have found that this flaring helps to maintain a smooth flow of the preencapsulated core extrudate through the filter chamber 312, and helps to maintain the relative radially outer/radially inner positioning of the preencapsular and core material.

EXAMPLE 1

Extrusion apparatus 10 shown in FIGS. 1, 3, 4, and 6 was utilized to produce a multilayer film similar to the multilayer film 12 shown in FIG. 2. A polyethylene resin having a 1.2 melt index and a density of 0.922 grams per cubic centimeter was extruded through outer layer extruder 34 at a rate of 73.5 pounds per hour to form outer layer 14 of the multilayer film 12. A copolymer of 77 percent ethylene and 23 percent vinyl acetate having a 5.5 melt index and a density of 0.93 grams per cubic centimeter was extruded through the glue extruder 38 at a rate of 12.4 pounds per hour to form glue layer 16.

A blend consisting predominantly of vinylidene chloride-vinyl chloride copolymer was extruded through the core extruder 42. The blend also contained approximately 5 percent of the same ethylene vinyl acetate copolymer used in the glue extruder 38. In the blend 95 percent was a copolymer consisting of 84.2 percent vinylidene chloride, 15 percent vinyl chloride, 0.4 percent magnesium oxide, and 0.4 percent plasticizer available under the trade designation of CITRO FLEX A-4 from Unitex Co. company of Greensboro, N.C. The specific gravity of the core material was approximately 1.65 grams per cubic centimeter and it was extruded at the rate of 14.1 pounds per hour to form core layer 20. The copolyer used in the preencapsular extruder 46 was the same 77 percent ethylene, 23 percent vinyl acetate copolymer used in glue extruder 38. The preencapsular extrudate was produced by the preencapsular extruder 46 at a rate of 1.9 pounds per hour to form preencapsulation layer 18. From these copolymers, and at these rates, a satisfactory film was produced for several hours with no evidence of thermal gradation.

EXAMPLE 2

The same materials and rates of production that were used in Example 1, were employed in Example 2, except that the encapsular 46 was slowed to produce the preencapsular extrudate at a rate of 1.5 pounds per hour. Satisfactory film was produced for 35 minutes having no evidence of thermal degradation.

EXAMPLE 3

The same materials and rates that were used for Example 1, were used in Example 3, except that preencapsular extruder 46 was slowed to produce encapsular extrudate at a rate of 1.0 pounds per hour. It was found that in approximately 10 minutes, the effects of thermal degradation of the core material began to appear.

In conclusion, by utilizing the filtering system of the present invention to filter a thermally degradable extrudate before delivery of the extrudate to a coextrusion die, a significant amount of impurities can be removed from the extrudate. The removal of these impurities helps to produce a higher quality multilayer film.

Having described the invention in detail, and by reference to the preferred embodiments thereof, it will be apparent that modification and variations are possible without the parting from the scope of the invention defined in the appended claims.

What is claimed is:

1. A filter for filtering a preencapsulated core extrudate having a preencapsular material component and a core material component,
   a casing,
   a frame mounted to said casing,
   a coarse filter screen through which said preencapsulated core extrudate can flow, said coarse filter screen being mounted to said frame, and being comprised of a web of woven strands having a sufficiently small diameter so as to permit the preencapsulated core extrudate to pass through and emerge from said coarse filter screen without substantial mixing of the preencapsular material and the core material, and
   a fine filter screen through which said preencapsulated core extrudate can flow, said fine filter screen being supported by said coarse filter screen upstream of said coarse filter screen and also being such as to permit the preencapsulated core extrudate to pass through a said fine filter screen without substantial mixing of the preencapsular material and the core material.

2. The filter of claim 1 wherein said frame is generally ring shaped.

3. The filter of claim 2 wherein said casing includes
a first casing member which defines a radially outwardly flared inlet portion, and
a second casing member which defines a radially inwardly flared outlet portion,
said first and second casing members being joined adjacent said frame.

4. The filter of claim 3 wherein said inlet portion is flared outwardly at an angle of between about 60 and 100 degrees to the direction of travel of said preencapsulated core extrudate.

5. The filter of claim 4 wherein said angle of said outward flare is about 75 degrees.

6. The filter of claim 3 wherein said outlet portion is flared inwardly at an angle of between about 100 and 135 degrees to the direction of travel of said preencapsulated core extrudate.

7. The filter of claim 6 wherein said angle of said inward flare is about 110 degrees.

8. The filter of claim 1 wherein said strands of said coards filter screen have a diameter of between about 0.025 and 0.063 inches, and a spacing between adjacent strands of about 0.125 inches.

9. An extrusion apparatus for coextruding a multilayer film from a plurality of feed stock materials comprising:
core extruder for extruding a core extrudate of core material,
a preencapsulation means disposed adjacent the outlet of said core extruder,
a transfer tube disposed downstream of said preencapsulation means.
a preencapsular extruder for extruding a preencapsular extrudate of preencapsulate material,
a preencapsular extrudate transfer means for transferring said preencapsular extrudate to said
said preencapsulation means including joining means for joining said preencapsular extrudate and said core extrudate in a surrounding relation for travel through said transfer tube so as to form a preencapsulated core extrudate,
a filter located at the downstream end of said transfer tube for filtering impurities from said preencapsulated core extrudate, said filter being configured to permit said preencapsulated core extrudate to flow through and emerge from said filter with said preencapsular material and said core material remaining in a coaxial, substantially unmixed relation.

10. The extrusion apparatus of claim 9 wherein said filter comprises:
a casing,
a frame mounted to said casing,
a coarse filter screen through which said preencapsulated core extrudate can flow, said coarse filter screen being mounted to said frame, and
a fine filter screen through which said preencapsulated core extrudate can flow, said fine filter screen being supported by said coarse filter screen and positioned upstream of said coarse filter screen.

11. The extrusion apparatus of claim 10, further comprising an intermediate filter screen supported by said coarse filter screen and positioned upstream of said coarse filter screen.

12. The extrusion apparatus of claim 11 wherein said casing includes
a first casing member which defines a radially outwardly flared inlet portion, and
a second casing member which defines a radially inwardly flared outlet portion,
said first and second casing members being joined adjacent said frame.

13. In a process for coextruding a multilayer film having a thermally degradable core material, a method for reducing carbonization of said thermally degradable core material comprising:
extruding a core extrudate of thermally degradable core material with a core extruder,
providing a preencapsulation means adjacent the outlet of said core extruder and a transfer tube downstream of said preencapsulation means,
extruding a preencapsular extrudate of preencapsular material and directing said preencapsular extrudate to said preencapsulation means,
joining together said core extrudate and said preencapsular extrudate in said preencapsulation means in a coaxial relation wherein said preencapsular extrudate is disposed radially outwardly of said core extrudate to preencapsulate said core extrudate,
directing said preencapsulated core extrudate through said transfer tube to a feed block and coextrusion die for coextrusion as a part of said multilayer film, and
filtering said preencapsulated core extrudate prior to directing it to said feed block and coextrusion die by passing it through a filter located at the downstream end of said transfer tube, said filter being configured to permit said preencapsulated core extrudate to flow through and emerge from said filter with said preencapsular material and said core material remaining in a substantially unmixed, coaxial relation.

14. The process of claim 13 wherein said preencapsulated core extrudate is directed through said filter to remove any particulate contaiminates and any by-products of any thermal degradation of said core extrudate.

15. The process of claim 14 wherein the step of directing said preencapsulated core extrudate through a filter comprises the step of directing said preencapsulated core extrudate through a filter having;
a casing,
a frame mounted to said casing,
a coarse filter screen through which said preencapsulated core extrudate can flow, said coarse filter screen being mounted to said frame , and
a fine filter screen through which said preencapsulated core extrudate can flow, said fine filter screen being supported by said coarse filter screen upstream of said coarse filter screen.

* * * * *